US012254694B2

(12) United States Patent
Chang et al.

(10) Patent No.: US 12,254,694 B2
(45) Date of Patent: Mar. 18, 2025

(54) IMAGE-BASED TUBE TOP CIRCLE DETECTION WITH MULTIPLE CANDIDATES

(71) Applicant: Siemens Healthcare Diagnostics Inc., Tarrytown, NY (US)

(72) Inventors: Yao-Jen Chang, Princeton, NJ (US); Stefan Kluckner, Berlin (DE); Benjamin S. Pollack, Jersey City, NJ (US); Terrence Chen, Princeton, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 572 days.

(21) Appl. No.: 16/630,286

(22) PCT Filed: Jun. 25, 2018

(86) PCT No.: PCT/US2018/039283
§ 371 (c)(1),
(2) Date: Jan. 10, 2020

(87) PCT Pub. No.: WO2019/013961
PCT Pub. Date: Jan. 17, 2019

(65) Prior Publication Data
US 2020/0232908 A1 Jul. 23, 2020

Related U.S. Application Data

(60) Provisional application No. 62/531,108, filed on Jul. 11, 2017.

(51) Int. Cl.
G01N 21/25 (2006.01)
G01N 35/00 (2006.01)
(Continued)

(52) U.S. Cl.
CPC .......... *G06V 20/52* (2022.01); *G01N 21/253* (2013.01); *G01N 35/00732* (2013.01);
(Continued)

(58) Field of Classification Search
CPC .......... G01N 21/253; G01N 35/00732; G01N 35/04; G01N 2035/0418; G01N 2035/0498; G06V 2201/06; G06V 20/52; G06K 9/00
See application file for complete search history.

(56) References Cited

U.S. PATENT DOCUMENTS

2004/0170318 A1   9/2004  Crandall et al.
2008/0056958 A1*  3/2008  Vijay .................. B01L 9/06
                                                          422/50

(Continued)

FOREIGN PATENT DOCUMENTS

CN   104364799 A   2/2015
JP   H09-073544 A  3/1997

(Continued)

OTHER PUBLICATIONS

PCT International Search Report and Written Opinion dated Sep. 19, 2018 (7 Pages).

(Continued)

*Primary Examiner* — P. Kathryn Wright
*Assistant Examiner* — Curtis A Thompson

(57) ABSTRACT

Embodiments provide a method of using image-based tube top circle detection based on multiple candidate selection to localize the tube top circle region in input images. According to embodiments provided herein, the multi-candidate selection enhances the robustness of tube circle detection by making use of multiple views of the same tube to improve the robustness of tube top circle detection. With multiple candidates extracted from images under different viewpoints (Continued)

of the same tube, the multi-candidate selection algorithm selects an optimal combination among the candidates and provides more precise measurement of tube characteristics. This information is invaluable in an IVD environment in which a sample handler is processing the tubes and moving the tubes to analyzers for testing and analysis.

16 Claims, 8 Drawing Sheets

(51) Int. Cl.
  *G01N 35/04* (2006.01)
  *G06V 20/52* (2022.01)
(52) U.S. Cl.
  CPC ..... *G01N 35/04* (2013.01); *G01N 2035/0418* (2013.01); *G01N 2035/0498* (2013.01)

(56) References Cited

U.S. PATENT DOCUMENTS

| | | | | |
|---|---|---|---|---|
| 2013/0019697 | A1* | 1/2013 | McKeen | G01N 35/00029 73/863.21 |
| 2013/0065797 | A1* | 3/2013 | Silbert | G01N 35/0099 73/304 C |
| 2013/0128035 | A1* | 5/2013 | Johns | B04B 15/00 348/135 |
| 2013/0129166 | A1* | 5/2013 | Muller | G01N 35/00732 382/128 |
| 2013/0333490 | A1* | 12/2013 | Tanoue | G01N 1/10 348/135 |
| 2013/0345894 | A1* | 12/2013 | Haddad | G01N 35/1011 700/302 |
| 2014/0063241 | A1* | 3/2014 | Li | G06T 7/75 348/143 |
| 2016/0025757 | A1* | 1/2016 | Pollack | H04N 5/2256 348/143 |
| 2017/0069113 | A1 | 3/2017 | Alpert et al. | |
| 2017/0124704 | A1* | 5/2017 | Wu | G06T 7/0012 |
| 2017/0269114 | A1* | 9/2017 | Bryant | G01N 35/10 |
| 2018/0003728 | A1* | 1/2018 | Satou | G01B 11/0608 |
| 2018/0046883 | A1* | 2/2018 | Soomro | G06T 7/11 |
| 2018/0047150 | A1* | 2/2018 | Chang | G06V 10/44 |

FOREIGN PATENT DOCUMENTS

| | | | |
|---|---|---|---|
| JP | 2004-265407 A | 9/2004 | |
| JP | 2011-100223 A | 5/2011 | |
| JP | 2017-068739 A | 4/2017 | |
| WO | 2014/152329 A1 | 9/2014 | |
| WO | WO-2015191702 A1 * | 12/2015 | ............. G01C 11/06 |
| WO | WO-2016133924 A1 * | 8/2016 | ....... G01N 35/00722 |

OTHER PUBLICATIONS

J. Canny, "A Computational Approach to Edge Detection," IEEE Trans. Pattern Analysis and Machine Intelligence, vol. 8, pp. 679-698, 1986.

H. K. Yuen, J. Prince, J. Illingworth, and J. Kittler, Comparative study of Hough transform methods for circle finding. Proc. 5th Alvey Vision Conf., 1989.

J. Platt, "Probabilistic Outputs for Support Vector Machines and Comparisons to Regularized Likelihood Methods," Advances in Large Margin Classifiers, 1999, pp. 1-11.

R. Veltkamp, "Shape Matching: Similarity Measures and Algorithms," International Conference on Shape Modeling and Applications, 2001.

K. Briechle and U. D. Hanebeck, "Template matching using fast normalized cross correlation", Proc. SPIE 4387, Optical Pattern Recognition XII, 2001, pp. 1-8.

* cited by examiner

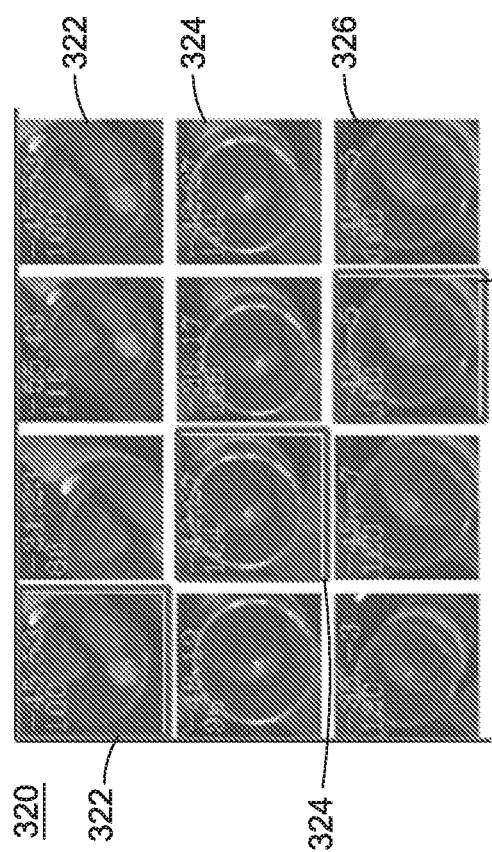
FIG. 3A
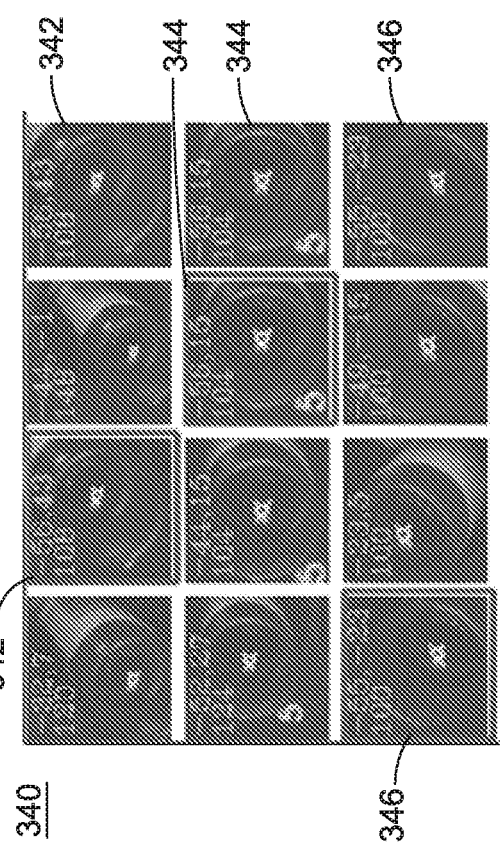
FIG. 3B
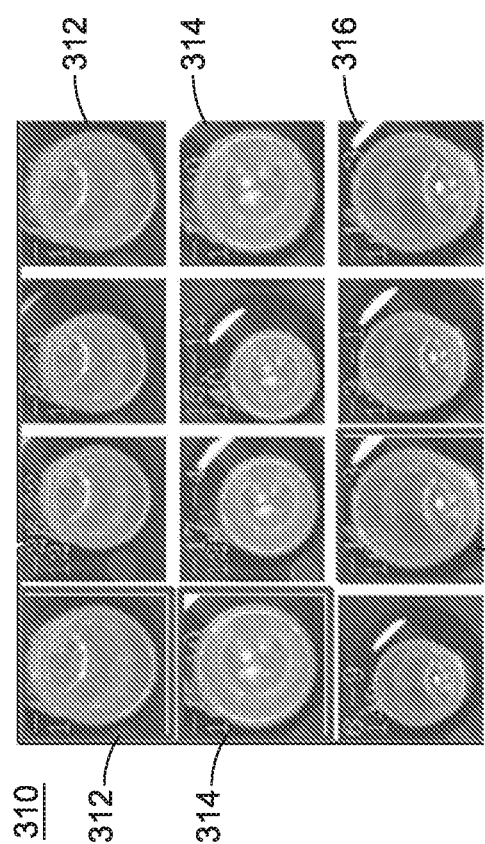
FIG. 3C
FIG. 3D

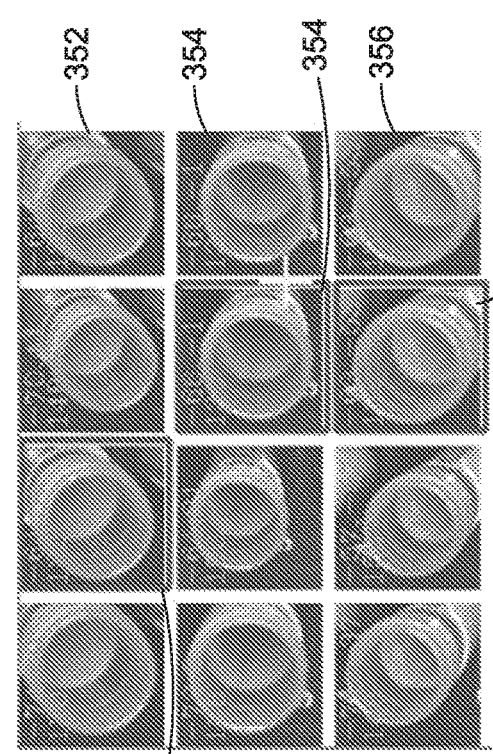
FIG. 3E
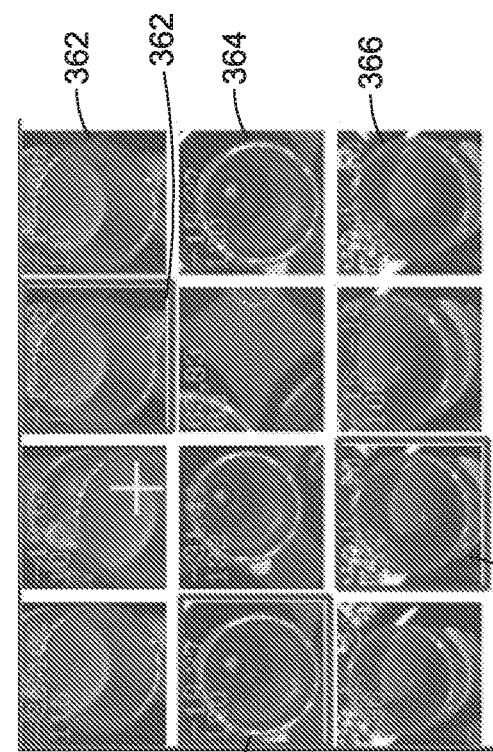
FIG. 3F
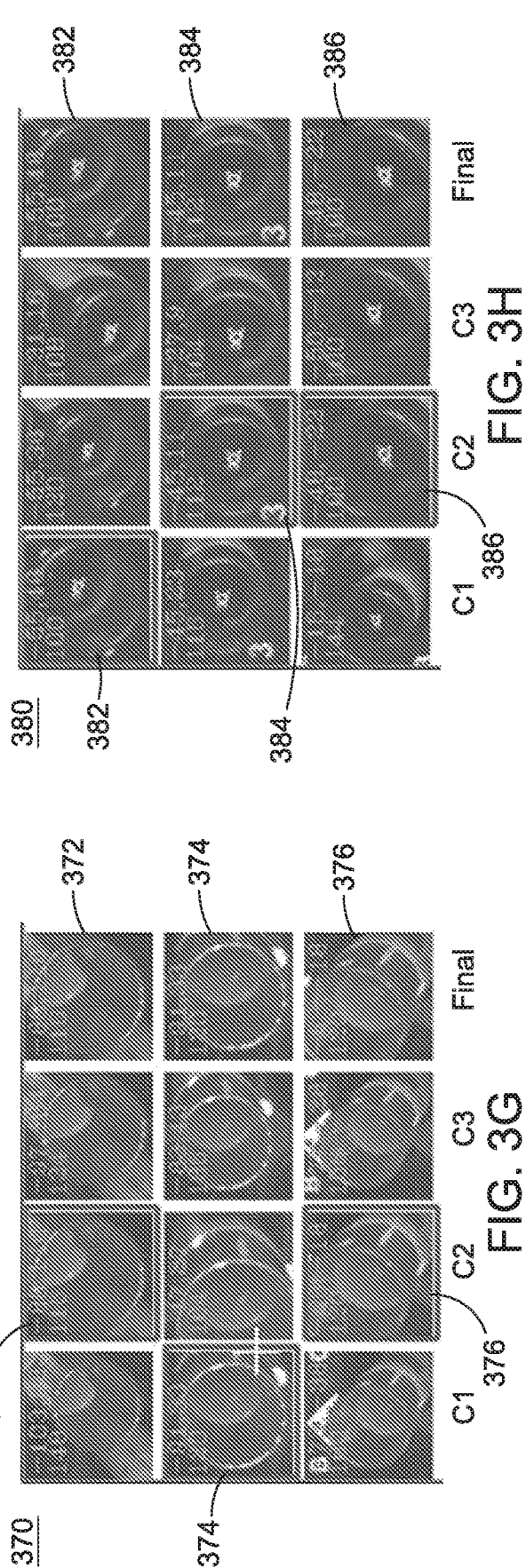
FIG. 3G
FIG. 3H

IMAGE-BASED TUBE TOP CIRCLE DETECTION WITH MULTIPLE CANDIDATES

CROSS-REFERENCE TO RELATED APPLICATIONS

This application claims priority to U.S. provisional application Ser. No. 62/531,108 filed on Jul. 11, 2017, the contents of which is incorporated herein by reference in its entirety.

TECHNOLOGY FIELD

The embodiments disclosed herein relate in general to capturing images of a tube tray to determine characteristics of the tubes held within the tray and, more particularly, to using image-based tube top circle detection with multiple candidates for accurate determination of the characteristics of the tubes held within the tray.

BACKGROUND

In vitro diagnostics (IVD) allows labs to assist in the diagnosis of disease based on assays performed on patient fluid samples. IVD includes various types of analytical tests and assays related to patient diagnosis and therapy that can be performed by analysis of a liquid sample taken from a patient's bodily fluids, or abscesses. These assays are typically conducted with automated clinical chemistry analyzers (analyzers) into which tubes or vials containing patient samples have been loaded. Because of the variety of assays needed in a modern IVD lab, and the volume of testing necessary to operate a lab, multiple analyzers are often employed in a single lab. Between and amongst analyzers, automation systems may also be used. Samples may be transported from a doctor's office to a lab, stored in the lab, placed into an automation system or analyzer, and stored for subsequent testing.

Storage and transport between analyzers is typically done using trays. A tray is typically an array of several patient samples stored in test tubes. These trays are often stackable and facilitate easy carrying of multiple samples from one part of the laboratory to another. For example, a laboratory may receive a tray of patient samples for testing from a hospital or clinic. That tray of patient samples can be stored in refrigerators in the laboratory. Trays of patient samples can also be stored in drawers. In some automation systems, an analyzer can accept a tray of patient samples and handle the samples accordingly, while some analyzers may require that samples be removed from trays by the operator and placed into carriers (such as pucks) before further handling. Trays are generally passive devices that allow samples to be carried and, in some cases, arranged in an ordered relationship.

Generally, information about sample tubes stored in a tray is not known until an operator or sample handling mechanism interacts with each tube. For example, a sample handling robot arm may pick up a tube, remove it from the tray, and place it into a carrier. The carrier can then travel to a decapper station to remove any possible cap and pass by a barcode reader so that a barcode on the side of the tube can be read to reveal the contents of the tube. In many prior art sample handling mechanisms, the identity of the tube is not known until after the tube is removed from the tray. In this manner, all tubes in a tray will often be handled the same way until after a tube is placed onto a carrier in an automation system.

SUMMARY

Embodiments provide a method of using image-based tube top circle detection. Embodiments are directed to an image-based method to further improve the robustness of tube circle detection and deal with more challenging cases by using multi-candidate selection.

According to an embodiment, a method of using image-based tube top circle detection comprises: receiving, from at least one camera, a series of images of a tray, the tray comprising a plurality of tube slots, each tube slot configured to receive a sample tube, the series of images of the tray being acquired via the at least one camera; extracting, using a processor, for a given sample tube a plurality of candidates in each image of the series of images; computing, using the processor, a plurality of consistency scores, each of the plurality of consistency scores between candidates across images in the series of images from possible combinations of the plurality of candidates; accumulating, using the processor, the plurality of consistency scores; and selecting, using the processor, a true tube top circle for the given sample tube for each image in the series of images based on a highest consistency score between candidates across the images in the series of images.

In an embodiment, computing the plurality of consistency scores comprises: determining, using the processor, the possible combinations of the plurality of candidates; computing, using the processor, properties for each of the possible combinations, the properties based on characteristics of respective ones of the plurality of candidates; and computing, using the processor, the plurality of consistency scores based on the computed properties. In an embodiment, the method further comprises saving the computed properties in a lookup table. In an embodiment, the properties comprise one or more of circle diameter, circle center location, circle height, and circle center offset. In another embodiment, the properties comprise one or more of shape, color, and texture across image patches.

In an embodiment, the tray is configured to fit within a portion of a drawer movable between an open position and a closed position and the image of the tray is acquired via the at least one camera as the drawer is moved between the open and the closed position.

According to an embodiment, the given sample tube in the series of images comprises the given sample tube in a plurality of different viewpoints.

In an embodiment, the method further comprises analyzing the true tube top circle for the given sample tube to determine tube categories and tube characteristics.

In an additional embodiment, a vision system for use in an in vitro diagnostics environment comprises: a tray comprising a plurality of tube slots arranged in a matrix of rows and columns, each tube slot configured to receive a sample tube; a surface configured to receive the tray; at least one camera configured to capture a series of images of the tray; and a processor configured to: extract for a given sample tube a plurality of candidates in each image of the series of images; compute a plurality of consistency scores, each of the plurality of consistency scores between candidates across images in the series of images from possible combinations of the plurality of candidates; accumulate the plurality of consistency scores; and select a true tube top circle for the given sample tube for each image in the series of images based on a highest consistency score between candidates across the images in the series of images.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the embodiments disclosed herein are best understood from the following detailed description when read in connection with the accompanying drawings. For the purpose of illustrating the embodiments disclosed herein, there is shown in the drawings embodiments that are presently preferred, it being understood, however, that the embodiments disclosed herein are not limited to the specific instrumentalities disclosed. Included in the drawings are the following Figures:

FIGS. 3A-3H are exemplary images of sample tubes depicting sample results of tube circle detection with multiple candidates, according to embodiments herein;

DETAILED DESCRIPTION

Figure 1A:
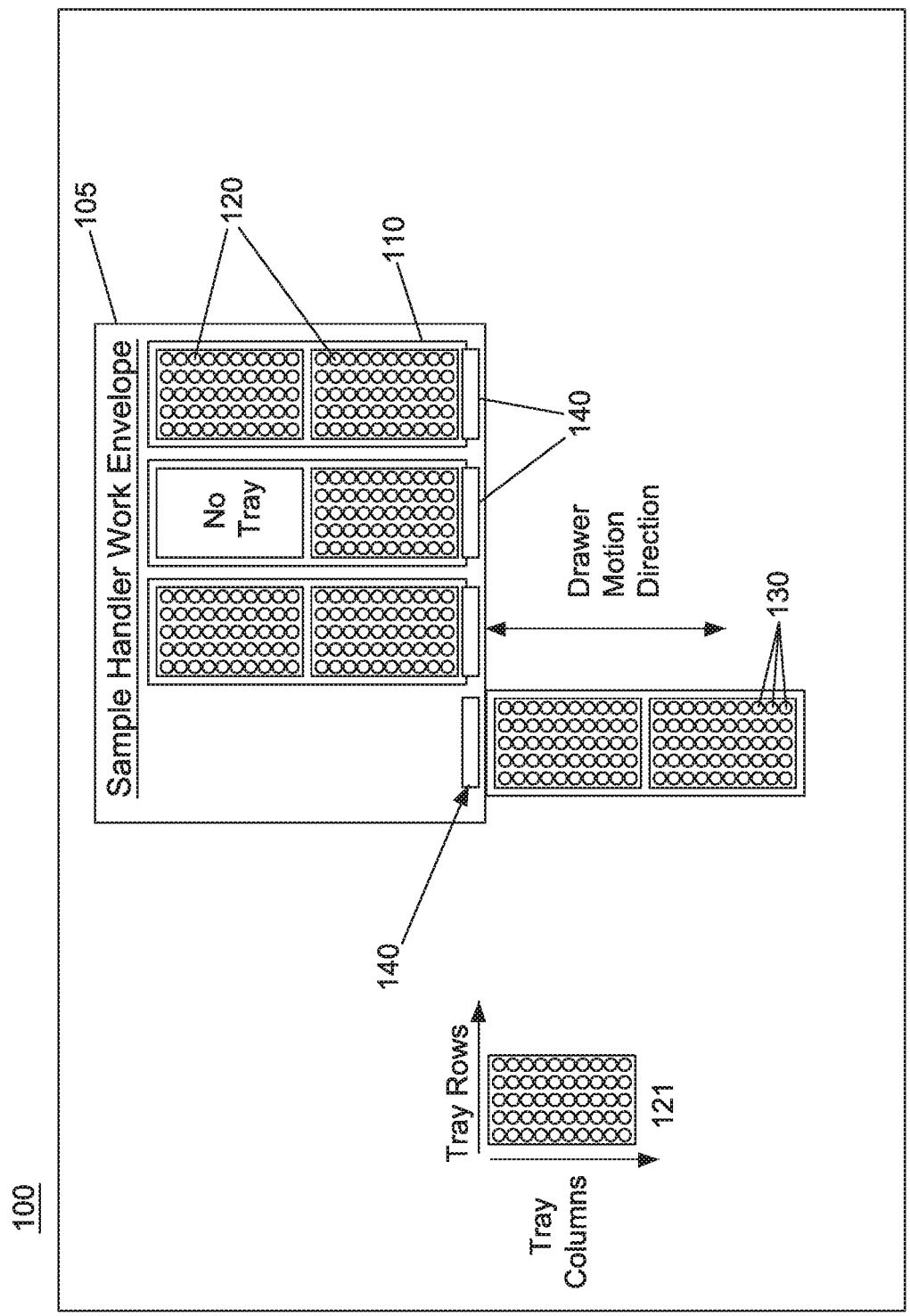
FIG. 1A is a representation of a system for characterizing through image analysis tube trays and tubes held in a drawer, according to an embodiment.

This application relates to several of the concepts described in PCT Application No. PCT/US14/27217, PCT Application No. PCT/US15/35092, and PCT Application No. PCT/US16/18109, each of which is incorporated, herein by reference, in its entirety.

Embodiments are directed to an image-based method to further improve the robustness of tube circle detection and deal with more challenging cases by using multi-candidate selection. This is crucial for sample tube categorization and characterization in the clinical lab automation system.

Embodiments include systems and methods for determining categories and characteristics of tubes held within a tube tray in an automated vision system configured to acquire images of the tube trays and tubes held within the tube trays. Some embodiments include acquiring images of trays that are manually placed and aligned in an automation system. For example, automation systems may provide a flat surface with guide rails and allow the operator to manually align keying features on the trays to the rails and push the trays to the working area.

Some embodiments may include an automated drawer vision system (DVS) comprising a drawer for loading and unloading tube trays on which sample tubes are contained. The images of the trays may be acquired via one or more cameras, mounted above an entrance area of the drawer, as the drawer is moved between an open position and a closed position (e.g., working area position).

According to embodiments, the acquired images are analyzed to determine the tube categories and tube characteristics. Embodiments use image-based tube top circle detection with multi-candidate selection to localize the tube top circle region in the input images. The tube top circle region may be utilized to determine the categories and characteristics of tubes having variation in their appearances.

As described in PCT Application No. PCT/US14/27217, a tube tray of a DVS is configured to fit within a drawer and hold a plurality of tubes in slots that are arranged in an array of rows and columns. The images are used to characterize the tray as well as the tubes held on the tray. In particular, according to embodiments, by analyzing the images, various features of the tubes can be determined, such as, for example, the tray slots containing a tube; a tube's center point in a coordinate system, a tube's diameter and height; the tray's orientation within a drawer; whether a tube is a plain tube, the tube is covered with a cap or tube-top sample cup; a tube cap's color(s), a barcode on a tray surface; and a speed at which a drawer holding the tray is being inserted or removed into the work environment. Embodiments determine this information and other pieces of information quickly, without expensive equipment, and without handling or touching the tubes. Such knowledge allows for an efficient and streamlined processing of the tubes, as well as for reduced setup and maintenance costs.

According to embodiments provided herein, the multi-candidate selection enhances the robustness of tube circle detection by making use of multiple views of the same tube to improve the robustness of tube top circle detection. With multiple candidates extracted from images under different viewpoints of the same tube, the multi-candidate selection algorithm selects an optimal combination among the candidates and provides more precise measurement of tube characteristics. This information is valuable in an IVD environment in which a sample handler is processing the tubes and moving the tubes to analyzers for testing and analysis.

FIG. 1A is a representation of an exemplary drawer vision system 100 in which tube trays 120 and tubes 130 contained thereon are characterized by obtaining and analyzing images thereof, according to an embodiment. One or more drawers 110 are movable between an open and a closed position and are provided in a work envelope 105 for a sample handler. One or more tube trays 120 may be loaded into a drawer 110 or may be a permanent feature of the drawer 110. Each tube tray 120 has an array of rows and columns of slots (as depicted in exemplary tray 121) in which tubes 130 may be held.

According to embodiments, images are taken of a tube tray 120. The images are analyzed to determine characteristics of the tube tray 120 and the tubes 130. A moving-tray/fixed camera approach is used, according to embodiments provided herein, to capture the images for analysis thereof. As the tube tray 120 is moved into the work envelope 105 by, for example, manually or automatically pushing in the drawer 110, an image capture system 140 is used to take images of the tube tray 120 and the tubes 130 contained thereon.

The image capture system 140 may include one or more cameras (e.g., left camera 242 and right camera 244 shown in FIG. 2) positioned at or near the entrance to the work envelope 105. In some embodiments, the one or more cameras 242, 244 may be positioned above the surface of the tube tray 120. For example, the cameras 242, 244 may be placed three to six inches above the surface to capture a high resolution image of the tube tray 120. Other distances and/or positioning may also be used depending on the features of the cameras 242, 244 and the desired perspective and image quality. Optionally, the image capture system 140 may include one or more lighting sources, such as an LED flash.

Figure 1B:
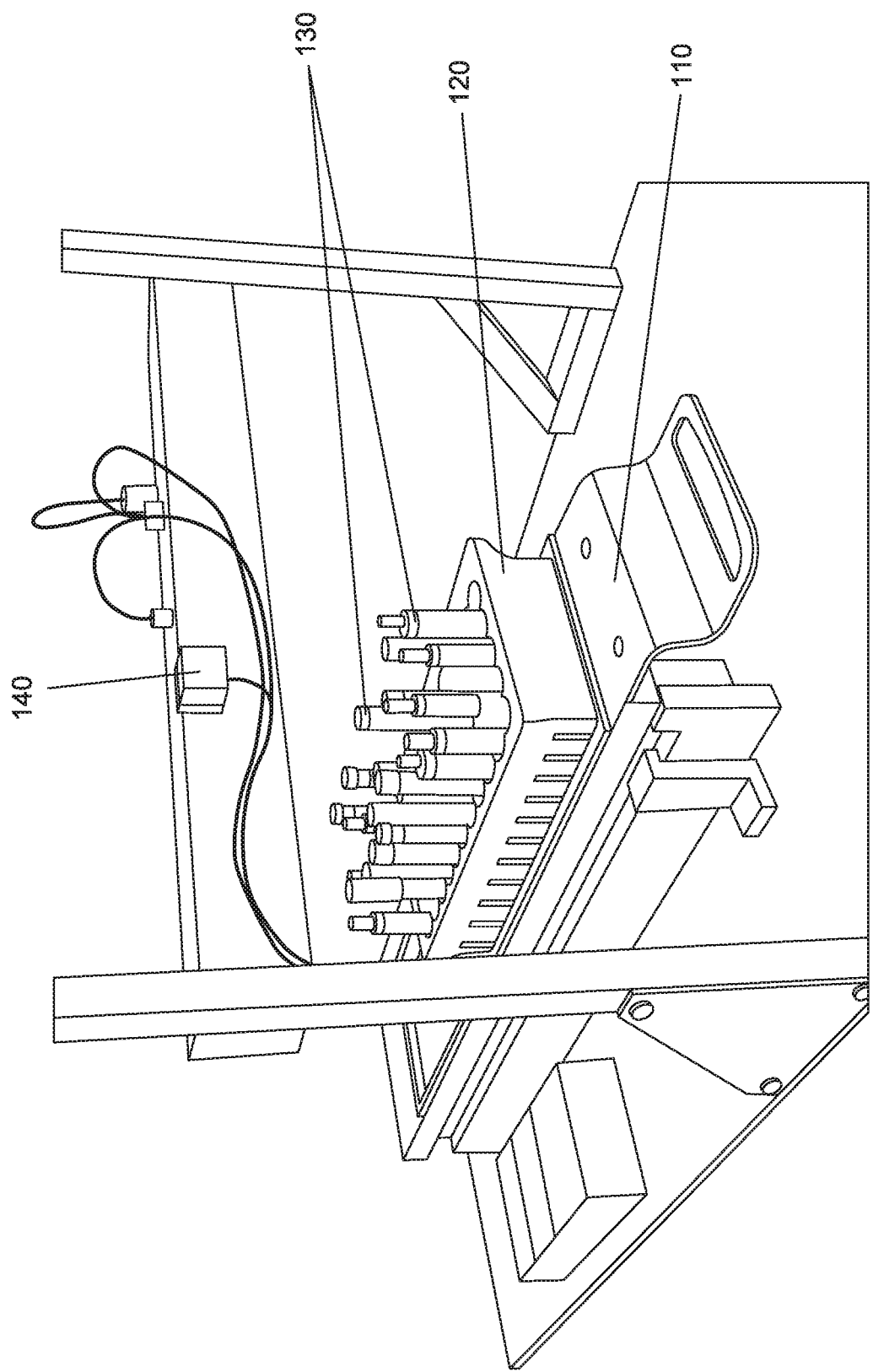
FIG. 1B shows an exemplary drawer vision system test harness including an image capture system positioned above a tube tray disposed on a drawer, according to an embodiment.

FIG. 1B shows an exemplary test harness of an exemplary drawer vision system that may be used with embodiments disclosed herein. As shown in FIG. 1B, image capture system 140 is positioned above the surface of the tube tray 120 holding tubes 130 and disposed on drawer 110. The drawer 110 shown in the embodiment at FIG. 1B is configured to hold two 55-slot trays or six 15-slot trays. Embodiments may, however, include trays configured to hold trays having different numbers of slots and having different sizes.

Figure 2:
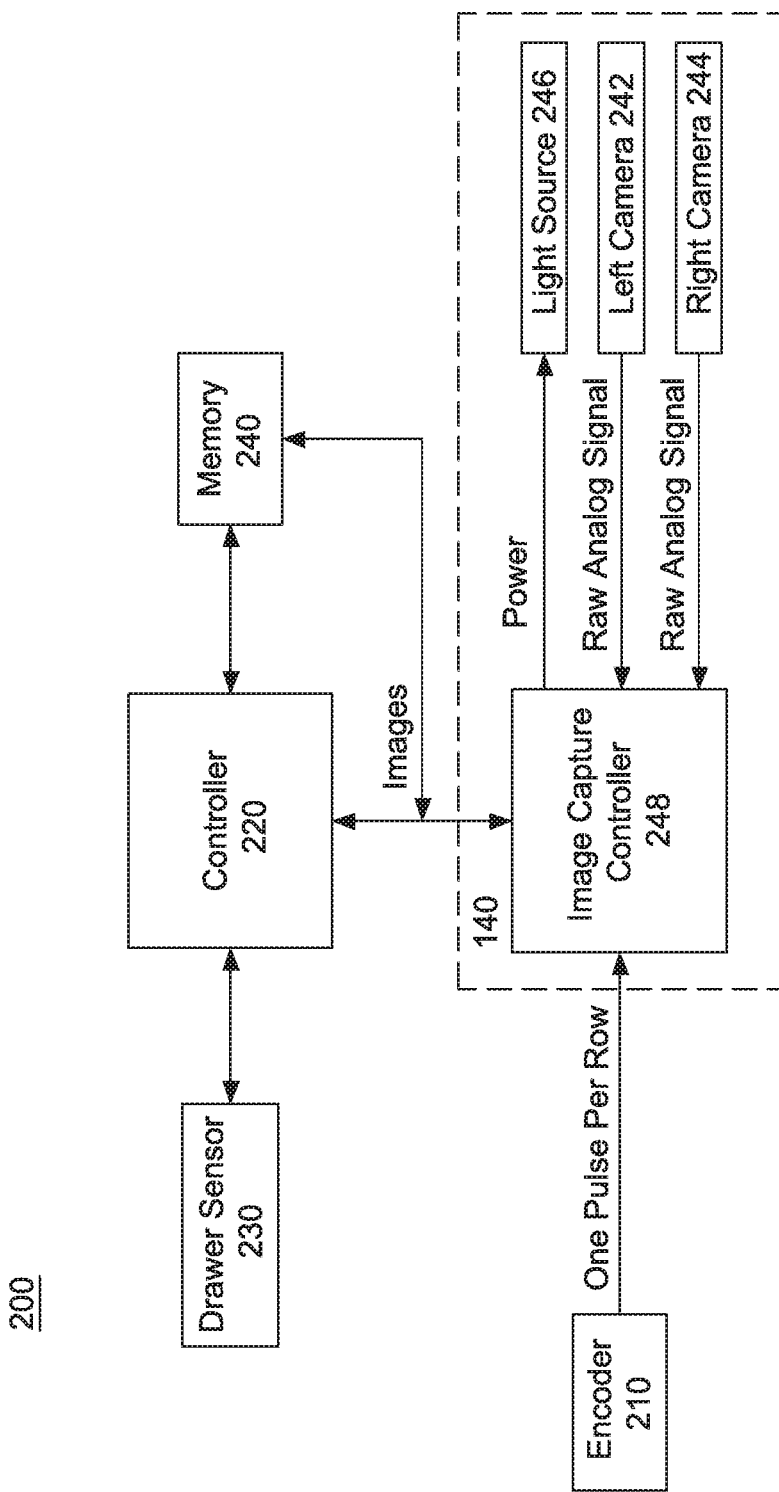
FIG. 2 shows a block diagram representation of a system for characterizing, through image analysis, the tube trays and the tubes contained thereon held in a drawer, according to an embodiment.

FIG. 2 shows a block diagram representation of an exemplary system 200 for characterizing, through image analysis, the tube trays 120 and the tubes 130 contained thereon held in a drawer 110, according to an embodiment. The image capture system 140, according to an embodiment, includes two cameras, a left camera 242 and a right camera 244. Additional or fewer cameras may be included depending on the size of the drawers 110 and the tube trays 120, as well as the desired image quality and image perspective. A light source 246 and an image capture controller 248 are also part of the image capture system 140.

An encoder 210, such as a quadrature encoder may be used to determine when a row of the tube tray 120 is moved into a centered or substantially centered position beneath the one or more cameras 242, 244. The encoder 210 transmits a signal (i.e., a pulse) to the image capture controller 248 upon detection of movement of the tube tray 120 corresponding to a new row of the tube tray 120 moving into a centered or substantially centered position beneath the one or more cameras 242, 244. The signal serves as an instruction for the image capture controller 248 to instruct the cameras 242, 244 to take an image upon receipt of the signal.

A controller 220 is provided for managing the image analysis of the images taken by the cameras 242, 244. Upon detection of the closing of the drawer 110, the image capture controller 248 provides the images to the controller 220 for downloading and processing. The controller 220 is, according to an embodiment, part of a sample handler that is used in the IVD environment to handle and move the tube trays 120 and the tubes 130 between storage locations, such as the work envelope 105, to analyzers. The image analysis performed by the controller 220 serves to instruct the sample handler on the various determined characteristics of the tube tray 120 and the tubes 130, thus allowing the sample handler to accordingly handle and process the tube tray 120 and the tubes 130.

The one or more memory devices 240 are associated with the controller 220. The one or more memory devices 240 may be internal or external to the controller 220.

One or more drawer sensors 230 may be connected to the controller 220 to indicate when the drawer 110 is fully closed and/or when the drawer 110 is fully opened. According to an embodiment, the drawer 110 being fully closed serves as an indication to begin image processing of the captured and stored images. When the drawer 110 is fully closed, the drawer sensor 230 sends a signal to the controller 220.

A camera's view of a sample tube 130 may be partially occluded by other sample tubes 130 in a tray 120 or self-occluded due to perspectives. Because a top circle of a tube 130 is less likely to be occluded than other portions of a tube 130, embodiments determine a category and/or a characteristic of a tube 130 based on the top circle of a tube 130.

As described in PCT Application No. PCT/US16/18109, edges detection like Canny edges provides an essential cue for image-based tube circle detection and localization algorithms. However, when there are many circular edges from various objects in the image, the edges of the tube top circle may not have the strongest response. Therefore, restricting the tube circle detection algorithm to output single detection result may eliminate the chance for the correct circle to be selected. According to embodiments herein, the idea of multi-candidate selection is to keep multiple candidates for each sample tube 130 in the image and defer the selection process until candidates from multiple images have been extracted. If the same tube 130 is visible in, for example, two or three images from different viewpoints, the optimal circle can then be selected from candidates across images by looking for the most consistent pairs or triplets from all possible combinations. In this way, a tube top circle with weaker edge response is more likely to be selected as long as it outperforms other candidates in the specified consistency measure.

According to an embodiment, a consistency score is computed based on one or more of the following properties: circle diameter (in pixels), circle center location (in pixels), circle height (in metric units), and circle center offset (in metric units). In an embodiment, the circle diameter and the circle center location may be directly obtained from the image patch of each single candidate. In an embodiment, the circle height and the circle center offset may be computed from a pair of candidates from two images. According to an embodiment, the height, diameter, and tube (or circle) center offset estimation may be computed from a pair of circle detection outputs from two images, as described in PCT Application No. PCT/US16/18109.

According to an embodiment, in which each sample tube 130 is observed by three viewpoints/images, there are $n^3$ triplets for each sample tube 130 if n candidates are kept for the tube 130 in each image. Among these $n^3$ triplets, there may be only 3n patches and $3n^2$ non-repetitive pairs. The properties for each patch and each pair are, in an embodiment, computed and saved in a lookup table. In every triplet, the consistency scores are accumulated from the three patches and the pairs involved in the triplet, and the one with the highest consistency score is chosen.

FIGS. 3A-3H are exemplary images of sample tubes 130 depicting eight sample results 310-380 of tube circle detection with multiple candidates, according to embodiments provided herein. Each sample set 310-380 includes 12 image patches arranged in a three by four grid. Each row of the grid includes the top three candidates from each image of the sample tube 130, and the candidate enclosed by a rectangle (e.g., 312, 314, and 316 in set 310 shown in FIG. 3A; 322, 324, 326 in set 320 shown in FIG. 3B; and so on) indicates the selected candidate out of the three candidates by the algorithm. The selected candidates (e.g., 312, 314, and 316 in set 310; 322, 324, and 326 in set 320) are provided on the last column of the grid.

It is observed that while the top one candidates listed on the first column of the grid of sets 310-380 appear to have the strongest edge response, this candidate is not always the best choice as the strong edge response may come from other objects. From the last column of each sample set 310-380, it is illustrated that the selected candidate forms a consistent triplet, which is more likely to be the true tube top circle.

Figure 4B:
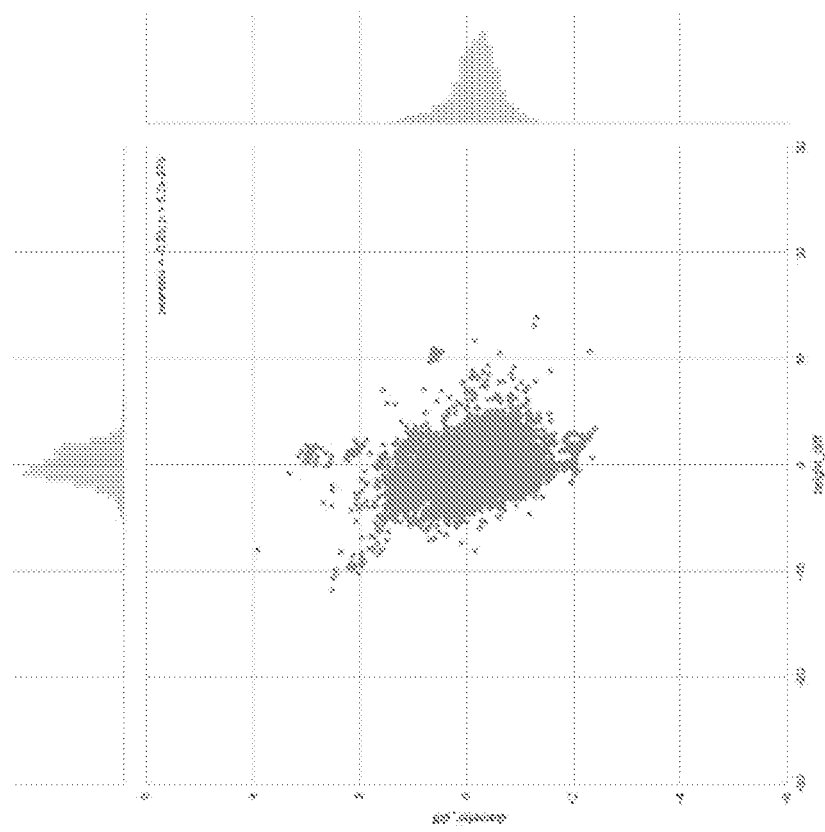
FIGS. 4A and 4B illustrate tube geometry estimation error distribution based on tube circle detection with a single candidate and multiple candidates.
Figure 4A:
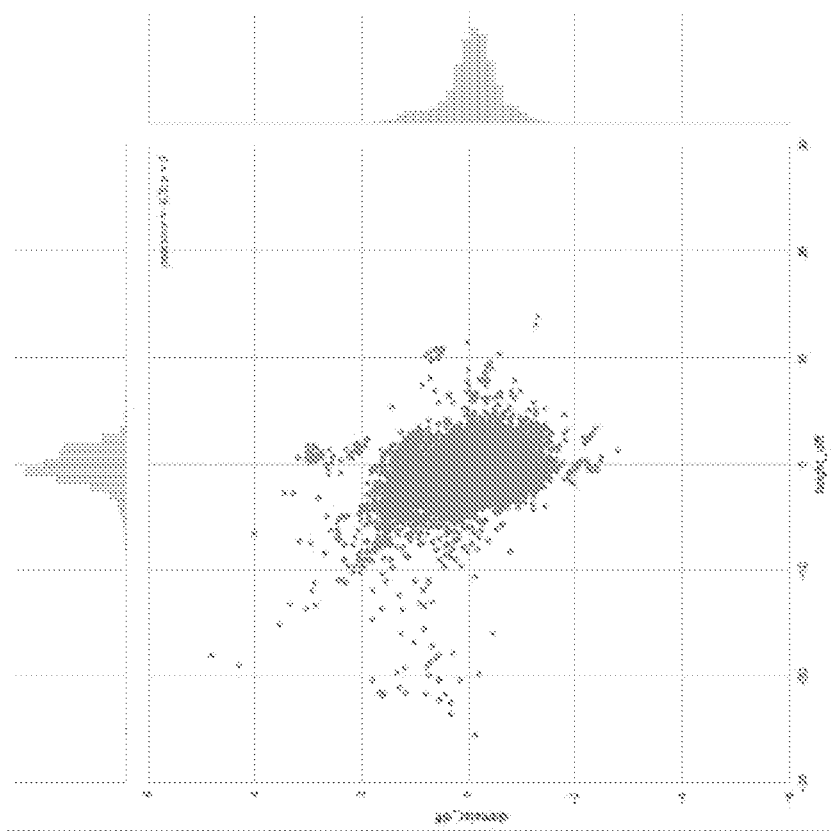

Quantitatively, the tube geometry estimation based on the tube circle detection with and without multiple candidates is compared and illustrated, as shown in FIGS. 4A and 4B (FIG. 4A detection with a single candidate (410) and FIG. 4B detection with multiple candidates (420)). From the joint distributions of tube height and diameter errors in millimeters, it is clearly shown that the one with multiple candidates outperforms the one with a single candidate.

The multi-candidate selection algorithm, according to embodiments, is applicable to the tube top circle detection and localization algorithm as described herein, and is also applicable to generic circle detection algorithms that can provide multiple candidates for the same tube in each observed image.

The consistency between candidates across multiple views can also be measured by other image features, such as but not limited to shape, color, and texture across image patches.

As the proposed drawer vision system provides at least three views for each sample tube 130, it is beneficial to use the proposed algorithm to improve the tube top circle detection and localization.

Figure 5:
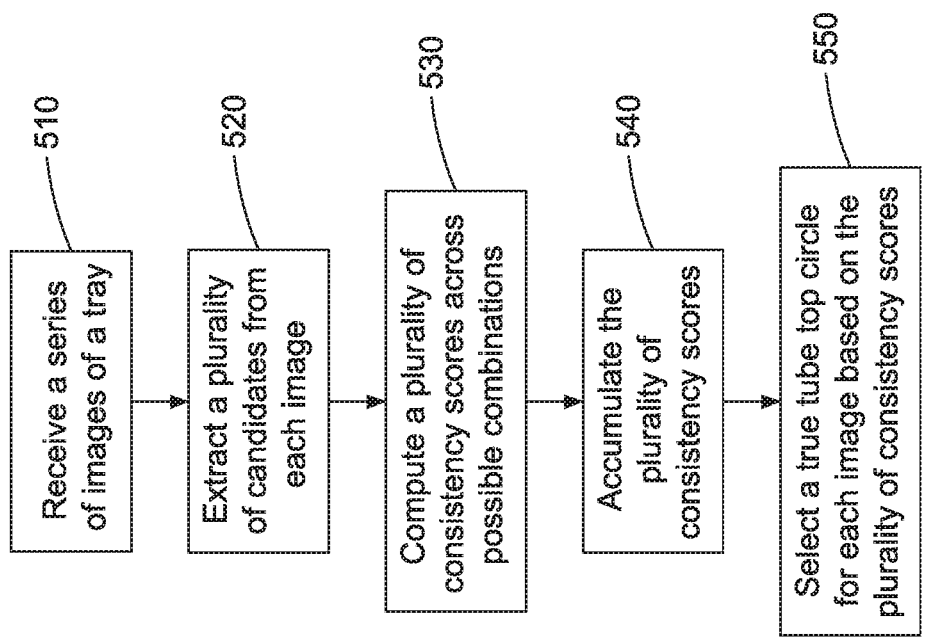
FIG. 5 is a flowchart illustrating a method of using image-based tube top circle detection according, to embodiments herein.

FIG. 5 is a flowchart 500 illustrating a method of using image-based tube top circle detection with multi-candidate selection, according to embodiments described herein.

At 510, from at least one camera, a series of images of a tray are received. In an embodiment, the tray comprises a plurality of tube slots, each tube slot configured to receive a sample tube 130, the series of images of the tray being acquired via the at least one camera.

At 520, using a processor, a plurality of candidates in each image of the series of images are extracted for a given sample tube.

At 530, the processor computes a plurality of consistency scores, each of the plurality of consistency scores between candidates across images in the series of images from possible combinations of the plurality of candidates.

At 540, the processor accumulates the plurality of consistency scores.

At 550, the processor is used to select a true tube top circle for the given sample tube for each image in the series of images based on a highest consistency score between candidates across the images in the series of images.

Figure 6:
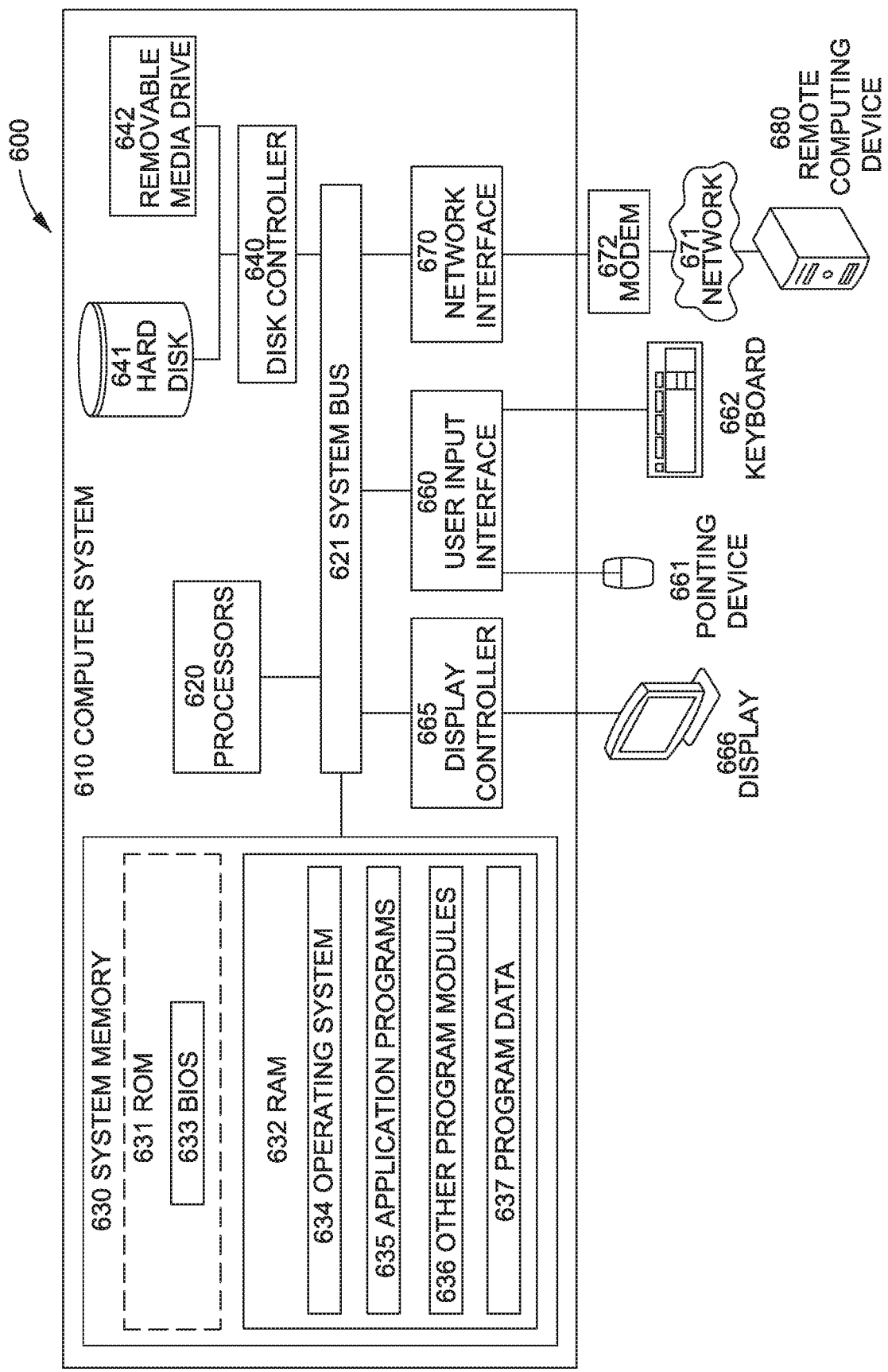
FIG. 6 illustrates an example of a computing environment within which embodiments of the invention may be implemented.

FIG. 6 illustrates an example of a computing environment 600 within which embodiments of the invention may be implemented. Computing environment 600 may be implemented as part of any component described herein. Computing environment 600 may include computer system 610, which is one example of a computing system upon which embodiments of the invention may be implemented. As shown in FIG. 6, the computer system 610 may include a communication mechanism such as a bus 621 or other communication mechanism for communicating information within the computer system 610. The system 610 further includes one or more processors 620 coupled with the bus 621 for processing the information. The processors 620 may include one or more CPUs, GPUs, or any other processor known in the art.

The computer system 610 also includes a system memory 630 coupled to the bus 621 for storing information and instructions to be executed by processors 620. The system memory 630 may include computer readable storage media in the form of volatile and/or nonvolatile memory, such as read only memory (ROM) 631 and/or random access memory (RAM) 632. The system memory RAM 632 may include other dynamic storage device(s) (e.g., dynamic RAM, static RAM, and synchronous DRAM). The system memory ROM 631 may include other static storage device(s) (e.g., programmable ROM, erasable PROM, and electrically erasable PROM). In addition, the system memory 630 may be used for storing temporary variables or other intermediate information during the execution of instructions by the processors 620. A basic input/output system (BIOS) 633 containing the basic routines that help to transfer information between elements within computer system 610, such as during start-up, may be stored in ROM 631. RAM 632 may contain data and/or program modules that are immediately accessible to and/or presently being operated on by the processors 620. System memory 630 may additionally include, for example, operating system 634, application programs 635, other program modules 636 and program data 637.

The computer system 610 also includes a disk controller 640 coupled to the bus 621 to control one or more storage devices for storing information and instructions, such as a magnetic hard disk 641 and a removable media drive 642 (e.g., floppy disk drive, compact disc drive, tape drive, and/or solid state drive). The storage devices may be added to the computer system 610 using an appropriate device interface (e.g., a small computer system interface (SCSI), integrated device electronics (IDE), Universal Serial Bus (USB), or FireWire).

The computer system 610 may also include a display controller 665 coupled to the bus 621 to control a display or monitor 666, such as a cathode ray tube (CRT) or liquid crystal display (LCD), for displaying information to a computer user. The computer system 610 includes a user input interface 660 and one or more input devices, such as a keyboard 662 and a pointing device 661, for interacting with a computer user and providing information to the processor 620. The pointing device 661, for example, may be a mouse, a trackball, or a pointing stick for communicating direction information and command selections to the processor 620 and for controlling cursor movement on the display 666. The display 666 may provide a touch screen interface which allows input to supplement or replace the communication of direction information and command selections by the pointing device 661.

The computer system 610 may perform a portion or all of the processing steps of embodiments of the invention in response to the processors 620 executing one or more sequences of one or more instructions contained in a memory, such as the system memory 630. Such instructions may be read into the system memory 630 from another computer readable medium, such as a hard disk 641 or a removable media drive 642. The hard disk 641 may contain one or more data stores and data files used by embodiments of the present invention. Data store contents and data files may be encrypted to improve security. The processors 620 may also be employed in a multi-processing arrangement to execute the one or more sequences of instructions contained in system memory 630. In alternative embodiments, hardwired circuitry may be used in place of or in combination with software instructions. Thus, embodiments are not limited to any specific combination of hardware circuitry and software.

As stated above, the computer system 610 may include at least one computer readable medium or memory for holding instructions programmed according to embodiments of the invention and for containing data structures, tables, records, or other data described herein. The term "computer readable medium" as used herein refers to any non-transitory, tangible medium that participates in providing instructions to the processor 620 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 641 or removable media drive 642. Non-limiting examples of volatile media include dynamic memory, such as system memory 630. Non-limiting examples of transmission media include coaxial cables, copper wire, and fiber optics, including the wires that make up the bus 621. Transmission media may also take the form of acoustic or light waves, such as those generated during radio wave and infrared data communications.

The computing environment 600 may further include the computer system 610 operating in a networked environment using logical connections to one or more remote computers, such as remote computer 680. Remote computer 680 may be a personal computer (laptop or desktop), a mobile device, a server, a router, a network PC, a peer device or other common network node, and typically includes many or all of the elements described above relative to computer 610. When used in a networking environment, computer 610 may include modem 672 for establishing communications over a network 671, such as the Internet. Modem 672 may be connected to system bus 621 via network interface 670, or via another appropriate mechanism.

Network 671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., remote computing system 680). The network 671 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 671.

A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and is conditioned using executable instructions to perform special purpose functions not performed by a general purpose computer. A processor may be coupled (electrically and/or as comprising executable components) with any other processor enabling interaction and/or communication there-between. Computer program instructions may be loaded onto a computer, including without limitation, a general purpose computer or special purpose computer, or other programmable processing apparatus to produce a machine, such that the computer program instructions which execute on the computer or other programmable processing apparatus create means for implementing the functions specified in the block(s) of the flowchart(s). A user interface processor or generator is a known element comprising electronic circuitry or software or a combination of both for generating display elements or portions thereof. A user interface (UI) comprises one or more display elements enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A graphical user interface (GUI), as used herein, comprises one or more display elements, generated by a display processor and enabling user interaction with a processor or other device and associated data acquisition and processing functions.

The UI also includes an executable procedure or executable application. The executable procedure or executable application conditions the display processor to generate signals representing the UI display images. These signals are supplied to a display device which displays the elements for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display elements in response to signals received from the input devices. In this way, the user interacts with the display elements using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

A workflow processor, as used herein, processes data to determine tasks to add to, or remove from, a task list or modifies tasks incorporated on, or for incorporation on, a task list, as for example specified in a program(s). A task list is a list of tasks for performance by a worker, user of a device, or device or a combination of both. A workflow processor may or may not employ a workflow engine. A workflow engine, as used herein, is a processor executing in response to predetermined process definitions that implement processes responsive to events and event associated data. The workflow engine implements processes in sequence and/or concurrently, responsive to event associated data to determine tasks for performance by a device and or worker and for updating task lists of a device and a worker to include determined tasks. A process definition is definable by a user and comprises a sequence of process steps including one or more, of start, wait, decision and task allocation steps for performance by a device and or worker, for example. An event is an occurrence affecting operation of a process implemented using a process definition. The workflow engine includes a process definition function that allows users to define a process that is to be followed and may include an event monitor. A processor in the workflow engine tracks which processes are running, for which patients, physicians, and what step needs to be executed next, according to a process definition and may include a procedure for notifying physicians of a task to be performed.

The system and processes of the figures presented herein are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. Further, the processes and applications may, in alternative embodiments, be located on one or more (e.g., distributed) processing devices on a network linking the units of FIG. 6. Any of the functions and steps provided in the Figures may be implemented in hardware, software or a combination of both. No claim element herein is to be construed under the provisions of 35 U.S.C. 112(f) unless the element is expressly recited using the phrase "means for."

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A method of image-based sample tube top circle detection across multiple images, the method comprising:
receiving, from at least one camera, a series of images of a tray, the tray comprising a plurality of tube slots, the tray holding a given sample tube in one of the plurality of tube slots;
extracting, using a processor, for the given sample tube a plurality of candidates in each image of the series of images;
computing, using the processor, a plurality of consistency scores, each of the plurality of consistency scores between candidates across images in the series of images from possible combinations of the plurality of candidates;
accumulating, using the processor, the plurality of consistency scores;
selecting, using the processor, a true tube top circle for the given sample tube for each image in the series of images based on a highest consistency score between candidates across images in the series of images;
analyzing the true tube top circle for the given sample tube to determine tube characteristics; and
determining a processing step for the given sample tube based on the determined tube characteristics.

2. The method of claim 1, wherein computing the plurality of consistency scores comprises:
determining, using the processor, the possible combinations of the plurality of candidates;
determining, using the processor, properties for each of the possible combinations, the properties based on one or more of characteristics of respective ones of the plurality of candidates and characteristics of respective ones of the images; and
computing, using the processor, the plurality of consistency scores based on the determined properties.

3. The method of claim 1, further comprising saving the determined properties in a lookup table.

4. The method of claim 2, wherein the properties comprise one or more of circle diameter, circle center location, circle height, and circle center offset.

5. The method of claim 2, wherein the characteristics of respective ones of the images comprise one or more of shape, color, and texture.

6. The method of claim 1, wherein the tray is configured to fit within a portion of a drawer movable between an open position and a closed position and the series of images of the tray is acquired via the at least one camera as the drawer is moved between the open position and the closed position.

7. The method of claim 1, wherein the series of images comprises a plurality of views of the given sample tube, each of the plurality of views at a different viewpoint.

8. The method of claim 1, further comprising analyzing the true tube top circle for the given sample tube to determine tube categories.

9. A vision system for use in an in vitro diagnostics environment comprising:
a tray comprising a plurality of tube slots arranged in a matrix of rows and columns, each tube slot configured to receive a sample tube;
a surface configured to receive the tray;
at least one camera configured to capture a series of images of the tray; and
a processor configured to:
extract for a given sample tube a plurality of candidates in each image of the series of images;
compute a plurality of consistency scores, each of the plurality of consistency scores between candidates across images in the series of images from possible combinations of the plurality of candidates;
accumulate the plurality of consistency scores;
select a true tube top circle for the given sample tube for each image in the series of images based on a highest consistency score between candidates across the images in the series of images;
analyze the true tube top circle for the given sample tube to determine tube characteristics; and
determine a processing step for the given sample tube based on the determined tube characteristics.

10. The system of claim 9, wherein computing the plurality of consistency scores comprises:
determining the possible combinations of the plurality of candidates;
determining properties for each of the possible combinations, the properties based on one or more of characteristics of respective ones of the plurality of candidates and characteristics of respective ones of the images; and
computing the plurality of consistency scores based on the determined properties.

11. The system of claim 10, wherein the processor is further configured to save the determined properties in a lookup table.

12. The system of claim 10, wherein the characteristics of respective ones of the images comprise one or more of circle diameter, circle center location, circle height, and circle center offset.

13. The system of claim 10, wherein the properties comprise one or more of shape, color, and texture.

14. The system of claim 9, wherein the surface comprises a portion of a drawer movable between an open position and a closed position and the series of images of the tray is acquired via the at least one camera as the drawer is moved between the open position and the closed position.

15. The system of claim 9, wherein the series of images comprises a plurality of views of the given sample tube, each of the plurality of views at a different viewpoint.

16. The system of claim 9, wherein the processor is further configured to analyze the true tube top circle for the given sample tube to determine tube categories.

* * * * *